(12) United States Patent
Seitoku (10) Patent No.: US 8,507,165 B2
(45) Date of Patent: Aug. 13, 2013

(54) BLACK PARTICLES AND A MANUFACTURING METHOD OF THE SAME, A BLACK TONER USING THE SAME, AND A PARTICLE CONTAINER AND A TONER CONTAINER

(71) Applicant: Fuji Xerox Co., Ltd., Tokyo (JP)

(72) Inventor: Shigeru Seitoku, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/687,956

(22) Filed: Nov. 28, 2012

(65) Prior Publication Data

US 2013/0089816 A1    Apr. 11, 2013

Related U.S. Application Data

(62) Division of application No. 12/631,137, filed on Dec. 4, 2009, now Pat. No. 8,349,069.

(30) Foreign Application Priority Data

Jun. 29, 2009 (JP) .................................. 2009-153165

(51) Int. Cl.
*G03G 9/08* (2006.01)

(52) U.S. Cl.
USPC .................... 430/107.1; 106/494; 264/503

(58) Field of Classification Search
USPC .................... 430/107.1; 106/494; 264/503
See application file for complete search history.

(56) References Cited

U.S. PATENT DOCUMENTS

2008/0232848 A1    9/2008  Proper et al.

FOREIGN PATENT DOCUMENTS

| | | |
|---|---|---|
| JP | A 2000-281924 | 10/2000 |
| JP | A 2003-119417 | 4/2003 |
| JP | A 2003-195569 | 7/2003 |
| JP | A 2005-041897 | 2/2005 |
| JP | A 2008-003360 | 1/2008 |
| JP | A 2008-120948 | 5/2008 |
| JP | A 2008-216624 | 9/2008 |

*Primary Examiner* — Mark A Chapman
(74) *Attorney, Agent, or Firm* — Oliff & Berridge, PLC (57) ABSTRACT

Black particles include a black pigment; and a cyan pigment, wherein when the reflectance to light of wavelength of 420 nm and the reflectance to light of wavelength of 770 nm of plural samples are measured, the standard deviations (1σ) of the measured values are about 1 or less with respect to both wavelengths.

14 Claims, 1 Drawing Sheet

BLACK PARTICLES AND A MANUFACTURING METHOD OF THE SAME, A BLACK TONER USING THE SAME, AND A PARTICLE CONTAINER AND A TONER CONTAINER

CROSS-REFERENCE TO RELATED APPLICATIONS

This is a Division of application Ser. No. 12/631,137 filed Dec. 4, 2009, which in turn is based on and claims priority under 35 USC 119 from Japanese Patent Application No. 2009-153165 filed on Jun. 29, 2009. The disclosure of the prior applications is hereby incorporated by reference herein in its entirety.

BACKGROUND

1. Technical Field

The present invention relates to black particles and a manufacturing method of the same, a black toner using the same, and a particle container and a toner container.

2. Related Art

Black particles are used in various uses. For example, black particles are used as inks and toners for, e.g., inkjet, copiers and printers, and for coloring black colors of paints and plastics. Carbon blacks are generally used as black particles since they are easily available, high in density, and inexpensive.

SUMMARY

According to an aspect of the invention, there is provided black particles including: a black pigment; and a cyan pigment, wherein when the reflectance to light of wavelength of 420 nm and the reflectance to light of wavelength of 770 nm of plural samples are measured, the standard deviations ($1\sigma$) of the measured values are about 1 or less with respect to both wavelengths.

BRIEF DESCRIPTION OF THE DRAWINGS

Exemplary embodiment(s) of the present invention will be described in detail based on the following FIGURE, wherein.

DETAILED DESCRIPTION

Figure 1:
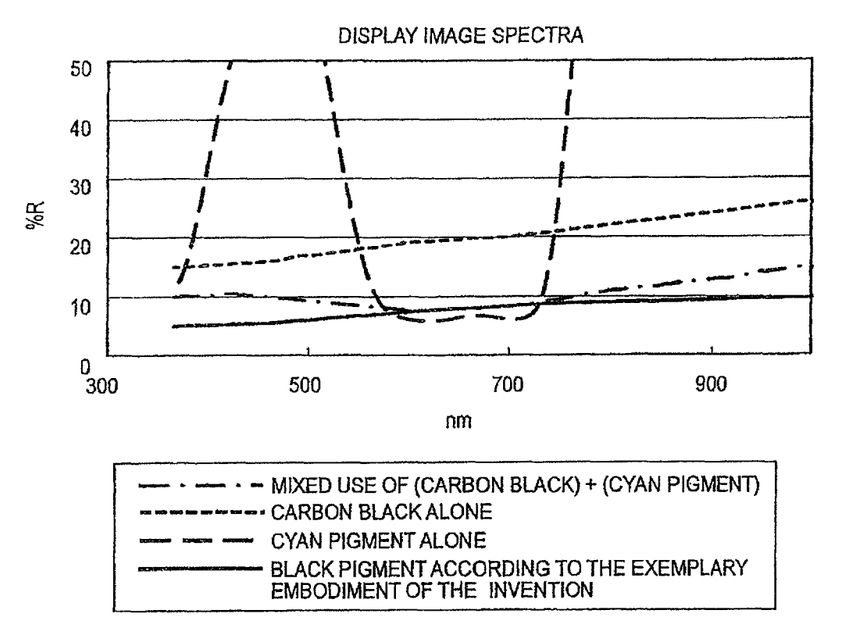
FIGURE is a graph showing light absorption spectra in the case of having formed display images with various pigments by plotting light wavelength (nm) as the axis of abscissa and light reflectance (%) as the axis of ordinate.

The invention will be described in detail below.
<Black Particles>
The black particles of the invention are useful compositions as black pigments, which include the following two kinds.
<1> Black particles including a black pigment and a cyan pigment, wherein when the reflectance to light of wavelength of 420 nm and the reflectance to light of wavelength of 770 nm of plural samples are measured, the standard deviations ($1\sigma$) of the measured values are 1 or less, or about 1 or less with respect to both wavelengths.
<2> Black particles including a black pigment and a cyan pigment, wherein the black pigment and the cyan pigment are unified in the form of agglomerate.

The embodiment <1> and the embodiment <2> are independent from each other, and there are cases where black particles that correspond with one invention do not correspond to the other invention, or they are within the purview of both inventions. It is of course preferred for black particles to correspond to both of the embodiment <1> and the embodiment <2>. For easily obtaining the black particles of the embodiment <1>, it is suitable to manufacture the black particles of the embodiment <2>, and the black particles of the embodiment <2> would satisfy the conditions of the black particles of the embodiment <1>.

The principles of the invention will be described below.

FIGURE is a graph showing light absorption spectra in the case of having formed display images with various pigments by plotting light wavelength (nm) as the axis of abscissa and light reflectance (%) as the axis of ordinate. The graph is practically a representative of light absorption spectra in the case of having formed display images with various pigments. Strictly speaking, the form of a graph varies by various conditions, but any case shows the similar or approximate tendency to the graph of FIGURE.

Black pigments such as carbon black have high absorption in the whole visible region (380 to 780 nm). However, as is seen from the graph of "carbon black alone" (dotted line) in FIGURE, black pigments have a characteristic such that absorption gradually lowers as the wavelength becomes longer (that is, the longer the wavelength, the more increases the reflectance little by little). Accordingly, a tendency to be reddish black due to insufficient absorption on the side of long wavelength by the use of carbon black alone is compensated for by the addition of a cyan pigment to reveal pure black.

As can be seen from the graph of "cyan pigment alone" (broken line) in FIGURE, since a cyan pigment is rich in long wavelength absorption and capable of offsetting high reflectance region of the long wavelength part of carbon black, absorption on the long wavelength side can be compensated for by the addition of a cyan pigment to carbon black. The graph of "mixed use of carbon black plus cyan pigment" (dash and dot line) in FIGURE shows absorption spectrum of light in the case of the mixture by adding a cyan pigment to carbon black.

When ink, toner or paint is manufactured by mixing a black pigment such as carbon black with a cyan pigment, the abundance ratio of pigments in the raw materials is liable to fluctuate according to manufacturing condition in every manufacturing time. That is, by making plural pigments present in one system, the degree of aggregation of the pigments changes. For example, taking carbon black and a cyan pigment as an example, when they are present together in one system, it is difficult for them to come nearer to each other, since carbon black and the cyan pigment have different structures, but carbon blacks and cyan pigments respectively having the same structures are aggregated with each other in many cases.

If such a phenomenon occurs, the pigments are to be present in an uneven state in the mixture of raw materials, so that an objective spectrum is difficult to obtain. Further, since aggregation behavior of the pigments fluctuates according to various manufacturing conditions (e.g., pH, temperature (heat), and mixing and stirring conditions and the like), the products (ink, toner, paint, and the like) to be obtained are large in fluctuation of light absorption spectrum with every manufacture. As a result, for example, in the case of inks and toners, there is high possibility that a tint varies with every manufacture lot of product especially when a low density image is printed out.

In the embodiment <1>, for restraining such malfunction, by preparing black particles wherein when the reflectance to light of wavelength of 420 nm and the reflectance to light of wavelength of 770 nm of plural samples are measured, the standard deviations (1σ) of the measured values are 1 or less, or about 1 or less with respect to both wavelengths, and using the black particles, innumerable black particles little in fluctuation of a tint are to be present in a product and even in a solution, resin and the like at manufacturing time. As a result, products little in fluctuation of light absorption spectra can be manufactured.

Incidentally, 420 nm and 770 nm of the measuring wavelengths are representatives of the wavelengths which are most variable in accordance with the mixed state when a black pigment and a cyan pigment are used as mixture.

As the number of samples, it is sufficient to measure five samples. The reflectance to light of wavelength of 420 nm and the reflectance to light of wavelength of 770 nm of five samples are respectively measured, and the standard deviations (1σ) are sufficient to be measured from the measured values obtained. When the standard deviations (1σ) are 1 or less, or about 1 or less with respect to both lights of wavelength of 420 nm and wavelength of 770 nm, the condition of the embodiment <1> is satisfied, the standard deviations (1σ) are preferably 0.9 or less, or about 0.9 or less and more preferably 0.8 or less, or about 0.8 or less.

Black particles of an object of measurement as a sample are spread all over a holder in a thickness of 1 mm and the reflectance (%) of light of the surface is found. When black particles are used in toner, a 100% solid image is formed with the obtained toner and light reflectance (%) of the solid image may be found. In this case, the proper toner amount (TMA) is 4 ($\times 10^{-4}$ g/cm$^2$) or so.

Ordinary spectrophotometers can be used in the measurement of reflectance with no problem. In the present specification, U-4000 (manufactured by Hitachi, Ltd.) is used in measurement.

In the specification of the invention, reflectance and absorptance are used together, and the relationship between them is as shown by the following equation (1).

$$\text{Absorptance \%} = 100\% - (\text{reflectance \%}) \quad (1)$$

In the embodiment <2>, for restraining the above malfunction, by unifying two kinds of a black pigment and a cyan pigment to one agglomerating particle prior to manufacture of a product, and using it as one black particle, innumerable particles of one particle including the black pigment and the cyan pigment unified in the form of an agglomerate and mixed homogeneously are to be present in a product and even in a solution, resin and the like at manufacturing time. Accordingly, it is presumed that products little in fluctuation of light absorption spectra can be manufactured. Incidentally, the graph (solid line) of "black particles according to the invention" in FIGURE shows light reflection spectrum in the case of the embodiment <2>.

Here, "unified in the form of an agglomerate" means a state of forming one particle constituting a complete whole without losing characteristic of each pigment such as crystallizability. Whether "being unified in the form of an agglomerate" or not can be easily discerned by qualitatively determining that at least two kinds of crystallizabilities of a black pigment and a cyan pigment are exerted in one particle. Since the fluctuation of a tint of the particles lowers, this can be judged simply by discerning whether the standard deviations (1σ) of the measured values are 1 or less with respect to both wavelengths or not when the reflectance to light of wavelength of 420 nm and the reflectance to light of wavelength of 770 nm of plural samples are measured.

In the invention, a black pigment and a cyan pigment are used in any of inventions <1> and <2>.

As usable black pigments, pigments showing a black color can be used with no limitation. Specifically, carbon black, aniline black, perylene, Nigrosine, cuttlefish ink, etc., can be exemplified. Of these black pigments, carbon black easily available, inexpensive and relatively high in blackness is most preferred.

As preferred carbon black, furnace black is suited for mass production, and oil absorbing amount, the particle size and the structure can be easily controlled, and so preferred. Specifically, #5, 10, 25 (manufactured by Mitsubishi Chemical Corporation), TOKA BLACK #7400, #7550SB/F, #7360SB (manufactured by Tokai Carbon Co., Ltd.), and NIPex 35, 60, 70, 90, 170IQ (manufactured by Evonik Degussa Japan) can be used. The above are some examples and the invention is not restricted thereto.

On the other hand, usable cyan pigments are not especially restricted, and inorganic pigments such as iron blue (e.g., Prussian blue), cobalt blue, etc., and organic pigments such as Alkali Blue lake, Victoria Blue lake, Fast Sky Blue, Indanthrene Blue BC, Aniline Blue, Ultramarine Blue, Chalco Oil Blue, Methylene Blue Chloride, Phthalocyanine Blue, Phthalocyanine Green, Malachite Green Oxalate, etc., can be exemplified. It is preferred to select organic pigments in view of the affinity to be unified with a black pigment in the form of an agglomerate, and Phthalocyanine Blue and Phthalocyanine Green are more preferred from the viewpoints of inexpensiveness, a waterproofing property and light fastness.

It is sufficient to use one kind respectively of a black pigment and a cyan pigment, but two or more pigments may be used with respect to either one or both.

The blending proportion of a black pigment and a cyan pigment cannot be said unconditionally, since it varies according to the kinds of pigments to be used, the objective tint and the like, and it is preferred to adopt a blending proportion such that light absorption in the visible region is leveled throughout the region as far as possible. From the general absorption spectral waveforms of a black pigment and a cyan pigment, by making nearer the reflectance to light of wavelength of 420 nm and the reflectance to light of wavelength of 770 nm, which wavelengths are most liable to fluctuate by a blending proportion, it can be presumed that light absorption in the whole visible region is substantially in a leveled state, thus the obtained black particles can be judged as almost equal to pure black little in a reddish tint.

Accordingly, it is sufficient to set up the blending proportion of both pigments so that the difference between the average of the reflectance to light of wavelength of 420 nm and the average of the reflectance to light of wavelength of 770 nm becomes smaller. Specifically, when the reflectance to light of wavelength of 420 nm and the reflectance to light of wavelength of 770 nm of plural samples are measured, the difference between the average of the reflectance to light of wavelength of 420 nm and the average of the reflectance to light of wavelength of 770 nm is preferably within 5%, and more preferably within 3%. Preparation and measuring method of a sample are the same as in the case of finding the fluctuation of reflectance in each wavelength.

It is preferred to select the practical blending proportion of a black pigment and a cyan pigment from the range of 10/1 to 2/1 by mass ratio, or about 10/1 to about 2/1 by mass ratio, and it is more preferred to select it from the range of 8/1 to 3/1, or about 8/1 to about 3/1.

The number average particle size of black particles in the invention is preferably 1 μm or less, or about 1 μm or less, and more preferably 0.5 μm or less, or about 0.5 μm or less. When the number average particle size exceeds 1 μm, the light absorbing property of black particles is liable to lower and more black particles are necessary, or the light absorbing spectrum widens and reflection in the longer wavelength parts is liable to occur in some cases, which are not preferred.

<Manufacturing Method of the Black Particles>

For unifying two kinds of a black pigment and a cyan pigment in the form of agglomerates, there are a method of chemically adhering them and a method of physically compressing. However, in chemical adhesion methods such as an acid paste method and a method using a solvent to dissolve and elute the pigments, there are fears such that chemical reaction may occur between a solution and other components in unification of the pigments in a liquid to cause decomposition, aiming homogenization in a liquid by aggregation may not be realized, or the crystal structures of the pigments may be influenced in a series of operations of dissolving or dispersing the pigments in a liquid followed by dehydration or hardening, so that it is difficult to homogeneously unify these two pigments.

Accordingly, in the manufacturing method of black particles in the invention (hereinafter referred to as merely "manufacturing method in the invention" in some cases), a method of applying physical impact, that is, a method of mixing a black pigment and a cyan pigment, and performing a compaction molding while applying load to the mixture of the pigments.

Transfer of pressure to particles can be generally expressed by the following equation (2) of Janssen.

$$(Fa/Fb) = \exp\{4\mu\omega k(L/D)\} \quad (2)$$

In equation (2), Fa and Fb represent the pressure on the upside of the pigment layer and the force transferred to the underside of the pigment layer, $\mu\omega$ is the friction coefficient of the wall surface, k is the ratio of stress in the radial direction and axial direction, L is the height of the layer, and D is the diameter of the layer.

Accordingly, pressure is applied to the pigment by making the value of Fa/Fb small, and particles unified in the form of agglomerates (black particles) can be obtained.

The specific examples of apparatus usable in the manufacturing method in the invention are not especially restricted so long as they are dry crushers. Specifically, a jaw crusher, a gyratory crusher, a cone crusher, a hammer crusher, a shredder, a roll crusher, a hammer mill, a disintegrator, a cutter mill, a disc mill, a rod mill, a roll mill, an aerofoil mill, a turbo crusher, a screen mill, a jet crusher, and a ball mill are exemplified. Post treatment is also easy with these drying methods.

For making the value of Fa/Fb small by using these apparatus, it is preferred to adopt a method of making the volume ratio of the pigment in crushed parts small for the purpose of making the pigment layer smaller, and a method of using media such as a ball mill. In the latter case, the value of Fa/Fb can be made small by making the size and the mass of the media to give an impact increase.

The reasons for using a crusher to unify pigments in the form of agglomerates are that the particle sizes of pigments are generally smaller than the particles crushed by a crusher, and pigments having secondary and tertiary particle sizes alone are broken without changing the crystal structures of pigments themselves by crushing, and capable of giving pressure and an impact suited for unifying plural pigments in the form of agglomerates.

Of these apparatus, any apparatus selected from the group consisting of a ball mill, a turbo crusher, a screen mill, and a jet crusher suited for the conditions to unify a black pigment and a cyan pigment in the form of agglomerates, that is to say, capable of finer crushing, is preferred. In particular, to use a ball mill, that is, according to a milling method, is preferred for the reason that the manufacturing conditions capable of easily manufacturing the black particles according to the invention can be optimally set up by arbitrarily selecting the size and mass of the ball as media.

The milling method is a physical method of putting pigments and balls in a container, turning the container round, and pressure bonding the pigments to each other by impingement of the balls against the pigments (application of pressure).

In the milling method, pigments as raw materials (a black pigment and a cyan pigment) and balls of, e.g., zirconia, glass, stainless steel or the like are put in a substantially cylindrical container, and when the cylindrical container is laid down, balls come together to the lower part of the container by gravity. When the container is rotated, the pigments and balls easily move along the wall of the container by centrifugal force, and when the rotation is adjusted, the contents fall down from near the top part of the wall of the container by centrifugal force. By this falling down, pigments are put between the balls and further easily unified in the form of agglomerates by this action.

The time for performing ball milling can be optionally changed, but if the time is too short, it is insufficient for the pigments to be unified in the form of agglomerates and high density black is difficult to obtain. It is preferred to select proper time in accordance with various conditions, and preferably selected from the range of 30 to 1,440 minutes or so.

Balls as media are preferably larger to unify pigments in the form of agglomerates, but efficiency lowers and pigments are not crystallized if balls are too large, and high density black is difficult to obtain in some cases. Crystallinity in a pigment mixture is preferably 10 to 80, and more preferably 20 to 60.

Here, "crystallinity" is found from the rate of change of strength of maximum peak 2θ of a crystal with an X-ray diffracting device. Specifically, crystallinity can be computed from the following equation (3).

$$\text{Crystallinity} = (\text{strength of maximum peak } 2\theta \text{ after pressure bonding/strength of maximum peak } 2\theta \text{ before pressure bonding}) \times 100 \quad (3)$$

For obtaining a pigment having such crystallinity, it is preferred for the diameter of a ball to be in the range of 1 mm to 50 mm, and the range of 5 mm to 20 mm is more preferred.

Further, in the container of the ball mill, the volume proportion of the pigments (the total amount of the black pigment and the cyan pigment) to the capacity of the container is effectively and preferably in the range of 5 to 20%, and the volume proportion of the balls is 10 to 60% respectively.

The black particles of the invention described above can be timely used in image-forming materials, e.g., inks, toners, etc., and other industrial products, e.g., paints, etc. In any and every use, black colors of a tint almost equal to pure black little in a reddish tint can be expressed with little fluctuation.

<Black Toner>

In the next place, as preferred use example of the black particles of the invention described above, a black toner (a black toner according to the invention) using the black particles will be described.

The black toner of the invention is characterized to contain at least the above-described black particles of the invention and a binder resin. In addition to the above, the black toner of the invention may contain, if necessary, wax (a releasing agent) and various internal additives. Further, an external additive may of course be added to the obtained black toner of the invention for use as an externally added toner.

The black toner of the invention is not especially restricted to be used as toner, but considering toner characteristics, the black toner of the invention is suited for use as a black toner for forming monochromatic black-and-white images. As the manufacturing method of the black toner of the invention, it is preferred to apply a kneading crushing method susceptible to mixing condition and heating condition.

The binder resins for use in the black toner of the invention are not especially restricted, and thermoplastic resins including various kinds of natural and synthetic polymers can be used. For example, the following resins can be exemplified.

Homopolymers and copolymers such as styrenes, e.g., styrene, chlorostyrene, etc.; monoolefins, e.g., ethylene, propylene, butylenes, isoprene, etc.; vinyl esters, e.g., vinyl acetate, vinyl propionate, vinyl benzoate, etc.; α-methylene aliphatic monocarboxylates, e.g., methyl acrylate, ethyl acrylate, butyl acrylate, dodecyl acrylate, octyl acrylate, phenyl acrylate, methyl methacrylate, ethyl methacrylate, butyl methacrylate, dodecyl methacrylate, etc.; vinyl ethers, e.g., vinyl methyl ether, vinyl ethyl ether, vinyl butyl ether, etc.; and vinyl ketones, e.g., vinyl methyl ketone, vinyl hexyl ketone, vinyl isopropenyl ketone, etc., can be exemplified.

In particular, when the black toner of the invention is manufactured according to a kneading crushing method, as more preferred binder resins, polystyrene, styrene-alkyl acrylate copolymers, styrene-alkyl methacrylate copolymers, styrene-acrylonitrile copolymers, styrene-butadiene copolymers, styrene-maleic anhydride copolymers, polyethylene, polypropylene, etc., can be exemplified. Further, polyester resin, polyurethane, epoxy resin, silicone resin, polyamide, modified rosin, paraffin, waxes, etc., can be exemplified.

Of these binder resins, polyester resins can be exemplified as more preferably used binder resins. In particular, it is preferred to use polyester resins synthesized from polyol components and polycarboxylic acid components by polycondensation as binder resins. For example, linear polyester resins including polycondensed products with bisphenol A and polyvalent aromatic carboxylic acid as main components can be preferably used.

As the polyol components for use in the synthesis of polyester resins, ethylene glycol, propylene glycol, 1,3-butanediol, 1,4-butanediol, 2,3-butanediol, diethylene glycol, triethylene glycol, 1,5-butanediol, 1,6-hexanediol, neopentyl glycol, cyclohexane dimethanol, hydrogenated bisphenol A, ethylene oxide adduct of bisphenol A, and propylene oxide adduct of bisphenol A are exemplified.

As the polycarboxylic acid components for use in the synthesis of polyester resins, maleic acid, fumaric acid, phthalic acid, isophthalic acid, terephthalic acid, succinic acid, dodecenylsuccinic acid, trimellitic acid, pyromellitic acid, cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methylenecarboxypropanetetramethylenecarboxylic acid, and anhydrides thereof are exemplified.

Further, as these polyester-based binder resins, resins having a softening temperature of 90° C. to 150° C., or about 90° C. to about 150° C., glass transition temperature (Tg) of 50° C. to 80° C., or about 50° C. to about 80° C., number average molecular weight of 2,000 to 7,000, mass average molecular weight of 8,000 to 15,000, or about 8,000 to about 15,000 acid value of 5 to 40, and hydroxyl group value of 5 to 50 are especially preferred in the viewpoint of fixing ability.

The pigments for use in the black toners of the invention are above-described black particles of the invention, and the blending proportion of the black particles is preferably from 1 mass % to 15 mass %, or from about 1 mass % to about 15 mass % on the basis of the total mass of the solids content constituting the toner, and more preferably from 3 mass % to 10 mass %, or about 3 mass % to about 10 mass %.

As the waxes capable of being added to the black toner of the invention, the following waxes can be exemplified. For example, paraffin wax and derivatives thereof, montan wax and derivatives thereof, microcrystalline wax and derivatives thereof, Fischer-Tropsch wax and derivatives thereof, polyolefin wax and derivatives thereof, etc., are exemplified. These derivatives include oxides, polymers with vinyl monomers and graft modified products. In addition to these, alcohols, fatty acids, vegetable waxes, animal waxes, mineral waxes, ester waxes, and acid amides can also be used.

The addition amount of these waxes to the black toner is preferably in the range of 1 to 25 mass %, and more preferably in the range of 3 to 10 mass %. When the addition amount of the wax is less than 1 mass %, fixation latitude (the temperature range of a fixing roller capable of fixing without being accompanied by the offset of the toner) is insufficient in some cases, while when it is more than 25 mass %, the powder fluidity of the toner is deteriorated and free wax is adhered to the surface of a photoreceptor for forming an electrostatic latent image and an electrostatic latent image cannot be formed correctly in some cases. It is preferred that these waxes are used in the range of not influencing coloration.

For further improving long term preservation, fluidity, developing ability and transferability of the black toner, alone or in combination of plural inorganic powders and resin powders may be used as internal additives. As the inorganic powders, e.g., silica, alumina, titania, and zinc oxide, and as the resin powders, spherical particles, e.g., polymethyl methacrylate (PMMA), amide resins (nylon=registered trademark), melamine resins, benzoguanamine resins, and fluorine resins, and amorphous powders, e.g., polyvinylidene chloride and fatty acid metal salts are exemplified. The addition amount of these internal additives is preferably in the range of 0.1 to 5 mass %, and more preferably in the range of 0.5 to 3 mass % (inner percentage) of the black toner particles.

These internal additives are added to the internal of the black toner by known methods, and heat fusion kneading treatment is especially preferably used. For the kneading at this time, various heating kneaders can be used. As the heating kneaders, a three roll type, a single screw type, a biaxial screw type, and a banbury mixer type are exemplified.

Further, in the case of manufacturing the particles of the black toner by crushing a kneaded product, Micronizer, Ulmax, JET-O-mizer and KTM (products of Cripton) can be used. As the process after that, a toner shape after crushing can be changed by applying mechanical external force with Hybridization System (manufactured by Nara Machinery Co., Ltd.), Mechano-Fusion System (manufactured by Hosokawa Micron Corporation), Criptron System (manufactured by Kawasaki Heavy Industries, Ltd.). A method of making particles spherical by hot blast can also be exemplified. Further, the particle size distribution of the toner may be adjusted by classification treatment.

The volume average particle size of the black toner of the invention is preferably in the range of 3 to 12 μm, and more preferably 5 to 10 μm. When the volume average particle size is smaller than 3 μm, electrostatic adhesion becomes high as compared with gravity and there is a high possibility that handling as powder is difficult in some cases. On the other hand, when the volume average particle size is larger than 12 μm, there is a high possibility that a high-definition image cannot be obtained in some cases.

Volume average particle size $D_{50v}$ and volume average particle size distribution index $GSD_v$ can be found by measurement by aperture diameter of 100 µm with Coulter Multisizer (manufactured by Beckman Coulter, Inc.). The measurement is performed after dispersing the toner in an electrolytic aqueous solution (Isoton II aqueous solution) and dispersing with ultrasonic wave for 30 seconds or more. The cumulative distributions of the volume and the number are drawn from the small size side in connection with the particle size ranges (channels) divided based on the particle size distribution of the toner to be measured. The particle sizes giving accumulation of 16% are designated as $D_{16v}$ for volume and $D_{16p}$ for number, the particle sizes giving accumulation of 50% are designated as $D_{50v}$ for volume and $D_{50p}$ for number, and the particle sizes giving accumulation of 84% are designated as $D_{84v}$ for volume and $D_{84p}$ for number. At this time, $D_{50v}$ represents a volume average particle size, and the volume average particle size distribution index ($GSD_v$) is found as $(D_{84v}/D_{16v})^{1/2}$. $(D_{84p}/D_{16p})^{1/2}$ represents the number average particle size distribution index ($GSD_p$).

External additives are not especially restricted, and known external additives such as inorganic and organic particles can be used. Of such external additives, inorganic particles, e.g., silica, titania, alumina, cerium oxide, strontium titanate, calcium carbonate, magnesium carbonate, calcium phosphate, etc.; metal soap, e.g., zinc stearate, and organic resin particles, e.g., fluorine-containing resin particles, silica-containing resin particles, and nitrogen-containing resin particles are preferred. The surfaces of external additives may be subjected to surface treatment according to purpose. As the surface treating agents, silane compounds, silane coupling agents and silicone oil for performing hydrophobitization treatment are exemplified.

The addition amount of external additives is preferably in the range of 1 to 10 mass % (outer percentage) of the black toner particles, and more preferably 3 to 8 mass %.

The average dispersion size of the pigments to be contained in the black toner is preferably 1 µm or less, and more preferably 0.5 µm or less. When the average dispersion size exceeds 1 µm, the absorption property of the black particles is liable to lower and more black particles are necessary, or the light absorption spectrum is liable to broaden in some cases, and so not preferred.

"Average dispersion size" means the average particle size of the black particles dispersed in the toner. The average dispersion size can be found by computing each particle size from the cross-sectional areas of 1,000 black particles dispersed in a toner by observing with a TEM (transmission electron microscope) (JEM-1010, manufactured by Nippon Denshi Datum) and averaging.

<Particle Container and Toner Container>

The particle container of the invention contains the black particles of the invention. The toner container of the invention contains the black toner of the invention.

"The particle container" and "the toner container" in the invention include containers for housing the pigment and toner during use in the concept, besides containers for storing the pigment and toner for the purpose of preservation, transportation, exhibition, and selling. Accordingly, the toner container to be mounted on an image-forming apparatus at the time of use is of course included in the toner container of the invention, and what is called a toner cartridge integrating a photoreceptor, a developer holder, a cleaning member and the like into a set and housing a toner inside (which cartridge is also called "a development cartridge" or "a developer cartridge") is also included in the category of "the toner container" in the invention.

Hereinafter, when both containers of "the particle container" and "the toner container" are indicated, they are called as "the pigment or toner container".

The pigment or toner container is generally made of a plastic material such as polystyrene, polypropylene, polycarbonate, or ABS resin. Therefore, when powder is stored, charge is liable to occur between the inner wall and the powder.

In the case where pigments are stored, charging property differs by the kind of pigment. Accordingly, when plural pigments are previously mixed and stored in a container for use as a mixture, malfunction is liable to occur from the difference in charging properties.

For example, there are cases where any pigment alone is hard to be put into a container in storing, a charged pigment is expelled from the container after storing and a blending proportion of the pigments does not reach a prescribed value, aggregation and uneven distribution occur at every kind of pigment in the container, and easiness of taking off of pigment differs with every pigment in taking out of the container due to the difference in charging property. When these phenomena are caused, there are apprehensions that fluctuation might occur in the blending proportion of pigments at the time of use, or an aiming blending proportion may not be reached.

However, the above-described black particles of the invention is little in fluctuation of the blending proportion of a black pigment and a cyan pigment contained, and there is little difference in charging characteristics of particles. As a result, the above malfunction hardly occurs in the particle container of the invention storing such black particles, and the black particles little in fluctuation of tint as a pigment can be stored in the container.

On the other hand, in the case where a toner is stored, charging property also differs by the kinds of pigments contained and the blending proportion. Accordingly, malfunction is liable to occur from the difference in charging property of each particle. In particular, since a toner is used for development by being charged, there is a possibility that the occurrence of charging difference in individual particles largely influences upon developing ability and stability.

As malfunction caused from the difference in charging property of individual particles, similarly to the case of the above particle container where different kinds of pigments are mixed and stored, there are capabilities of problems such that the difference may be caused in the easiness of putting the toner into the container, and fluctuation may occur in the blending proportion due to expelling from the container after being stored, or there arises difference in easiness of taking the toner out of the container. In particular, in the case of toners, fluctuation in charging characteristics influences developing property and there is a possibility that image quality may be influenced such as generation of fluctuation in image density.

However, the above-described black toner of the invention is little in fluctuation of the blending proportion of a black pigment and a cyan pigment contained in individual toner particles, and there is little difference in charging characteristics of particles. As a result, the above malfunction hardly occurs in the toner container of the invention storing such black toner, and the black toner difficultly causing image quality reduction from unevenness of tint as a toner image and fluctuation in developing characteristics can be stored in the container.

EXAMPLE

The invention will be described more specifically and in further detail with reference to examples and comparative examples, but the invention is by no means restricted thereto. In the examples "parts" and "%" mean "mass parts" and "mass percents" unless otherwise indicated.

[Each Measuring Method]

In the invention, each measurement is performed as follows.

<Reflection Spectrum>

The spectrum of the reflectance (reflection spectrum) of a toner image is measured with a spectrophotometer (U-4000, manufactured by Hitachi, Ltd.).

<Crystallinity>

Crystallinity is found from the ratio of the maximum peak before and after treatment with an X-ray diffracting device (a product of Rigaku Corporation).

Example 1

(Manufacture of Black Particles)

As a cyan pigment, 0.2 mass parts of C.I. Pigment Blue 15:3 (manufactured by Dainichiseika Color & Chemicals Mfg. Co., Ltd.), as a carbon black pigment, 0.8 mass parts of NIPex 170IQ (manufactured by Evonik Degussa Japan), and 50 parts of agate balls having a diameter of 1 cm are put in a 100 ml bottle with a cap. At this time, the volume proportion of the total amount of the black pigment and the cyan pigment to the capacity of the bottle is 10%, and the volume proportion of the agate balls is 45%. After that, milling treatment is performed with a ball mill on the condition of 50 rpm to obtain black particles (1). The pigment characteristics of obtained black particles (1) are shown together in Table 1 below.

(Preparation 1 of Black Toner)

A mixture of toner raw materials including 87 mass parts of linear polyester (linear polyester obtained from terephthalic acid·bisphenol A·ethylene oxide 2 mol adduct/cyclohexane dimethanol, glass transition temperature (Tg): 62° C., number average molecular weight (Mn): 4,000, mass average molecular weight (Mw): 35,000, acid value: 12, hydroxyl group value: 25) as a binder resin, 8 mass parts of above black particles (1), and 5 mass parts of wax (long-chain linear fatty acid long-chain linear saturated alcohol; stearyl behenate) as an additive is kneaded in an extruder, crushed, and followed by classification to fine particles and crude particles by an air classifier to obtain black toner particles (1-a) having a volume average particle size (average particle size $D_{50v}$) of 9.6 μm.

Externally added toner (1-a) is obtained by adding 1.2 parts of hydrophobic silica (TS720, manufactured by Cabot, particle size: 16 nm) to 50 parts of black toner particles (1-a), and mixing with a sample mill.

(Preparation 1 of Developer)

By using a ferrite carrier covered with polymethyl methacrylate (manufactured by The Soken Chemical & Engineering Co., Ltd.) by 1% having an average particle size of 50 μm, externally added toner (1-a) is weighed so as to reach toner density of 5%, and the carrier and externally added toner (1-a) are stirred and mixed with a ball mill for 5 minutes to prepare developer (1-a).

(Preparation 2 of Black Toner and Developer)

The operations of (preparation 1 of black toner) and (preparation 1 of developer) are further repeated in total of four times to prepare black toner particles (1-b), (1-c), (1-d) and (1-e), externally added toners (1-b), (1-c), (1-d) and (1-e), and developers (1-b), (1-c), (1-d) and (1-e), thus five lots in total of black toner particles, externally added toners and developers respectively are obtained. Toner characteristics of respective black toner particles are shown in Table 2 below.

(Evaluation Test)

A toner image having a size of 50 mm×50 mm is formed by using each of five lots of developers (1-a) to (1-e) in a toner amount (TMA) of 4 ($\times 10^{-4}$ g/cm$^2$) with modified DocuColor 500CP (manufactured by Fuji Xerox Co., Ltd.) as the image-forming apparatus. A4 size white paper (J-A4 paper, width: 210 mm, length: 297 mm, manufactured by Fuji Xerox Co., Ltd.) is used as a recording medium.

The reflectance (ΔR) of the surface of the formed toner fixed image at 420 nm and 770 nm is measured with a spectral reflection measuring apparatus (U-4000, manufactured by Hitachi, Ltd.) is measured, and standard deviation (σ) is computed from the measured values. The results obtained are shown in Table 2 below.

Example 2

(Manufacture of Black Particles)

Black particles (2) are obtained according to the same operations as in Example 1 except for changing the milling time with a ball mill from 0.5 hours to 24 hours. The pigment characteristics of obtained black particles (2) are shown together in Table 1 below.

(Preparation of Black Toner and Developer)

In the next place, five lots in total of black toner particles (2-a), (2-b), (2-c), (2-d) and (2-e), externally added toners (2-a), (2-b), (2-c), (2-d) and (2-e), and developers (2-a), (2-b), (2-c), (2-d) and (2-e) are prepared according to the same operations as in Example 1. Toner characteristics of respective black toner particles are shown in Table 2 below.

(Evaluation Test)

An evaluation test is performed in the same manner as in Example 1 by using five lots of developers (2-a) to (2-e), and standard deviation (σ) is computed from the values of reflectance (ΔR) at 420 nm and 770 nm. The results obtained are shown in Table 2 below.

Example 3

(Manufacture of Black Particles)

Black particles (3) are obtained according to the same operations as in Example 1 except for changing the black pigment from carbon black to aniline black (Diamond Black S, manufactured by Noma Chemical Industry Co., Ltd.). The pigment characteristics of obtained black particles (3) are shown together in Table 1 below.

(Preparation of Black Toner and Developer)

In the next place, five lots in total of black toner particles (3-a), (3-b), (3-c), (3-d) and (3-e), externally added toners (3-a), (3-b), (3-c), (3-d) and (3-e), and developers (3-a), (3-b), (3-c), (3-d) and (3-e) are prepared according to the same operations as in Example 1. Toner characteristics of respective black toner particles are shown in Table 2 below.

(Evaluation Test)

An evaluation test is performed in the same manner as in Example 1 by using five lots of developers (3-a) to (3-e), and standard deviation (σ) is computed from the values of reflectance (ΔR) at 420 nm and 770 nm. The results obtained are shown in Table 2 below.

Example 4

(Manufacture of Black Particles)

Black particles (4) are obtained according to the same operations as in Example 1 except for changing the black pigment from carbon black to perylene (S0084, manufactured by BASF Japan Limited). The pigment characteristics of obtained black particles (4) are shown together in Table 1 below.

(Preparation of Black Toner and Developer)

In the next place, five lots in total of black toner particles (4-a), (4-b), (4-c), (4-d) and (4-e), externally added toners (4-a), (4-b), (4-c), (4-d) and (4-e), and developers (4-a), (4-b), (4-c), (4-d) and (4-e) are prepared according to the same operations as in Example 1. Toner characteristics of respective black toner particles are shown in Table 2 below.

(Evaluation Test)

An evaluation test is performed in the same manner as in Example 1 by using five lots of developers (4-a) to (4-e), and standard deviation (σ) is computed from the values of reflectance (ΔR) at 420 nm and 770 nm. The results obtained are shown in Table 2 below.

Example 5

(Manufacture of Black Particles)

Black particles (5) are obtained according to the same operations as in Example 1 except for changing the black pigment from carbon black to cuttlefish ink (Ika Black, manufactured by Toyo Ink Mfg. Co., Ltd.). The pigment characteristics of obtained black particles (5) are shown together in Table 1 below.

(Preparation of Black Toner and Developer)

In the next place, five lots in total of black toner particles (5-a), (5-b), (5-c), (5-d) and (5-e), externally added toners (5-a), (5-b), (5-c), (5-d) and (5-e), and developers (5-a), (5-b), (5-c), (5-d) and (5-e) are prepared according to the same operations as in Example 1. Toner characteristics of respective black toner particles are shown in Table 2 below.

(Evaluation Test)

An evaluation test is performed in the same manner as in Example 1 by using five lots of developers (5-a) to (5-e), and standard deviation (σ) is computed from the values of reflectance (ΔR) at 420 nm and 770 nm. The results obtained are shown in Table 2 below.

Example 6

(Manufacture of Black Particles)

Black particles (6) are obtained according to the same operations as in Example 1 except for changing the black pigment from carbon black to Titanium Black (13M-C, manufactured by Mitsubishi Materials Corporation). The pigment characteristics of obtained black particles (6) are shown together in Table 1 below.

(Preparation of Black Toner and Developer)

In the next place, five lots in total of black toner particles (6-a), (6-b), (6-c), (6-d) and (6-e), externally added toners (6-a), (6-b), (6-c), (6-d) and (6-e), and developers (6-a), (6-b), (6-c), (6-d) and (6-e) are prepared according to the same operations as in Example 1. Toner characteristics of respective black toner particles are shown in Table 2 below.

(Evaluation Test)

An evaluation test is performed in the same manner as in Example 1 by using five lots of developers (6-a) to (6-e), and standard deviation (σ) is computed from the values of reflectance (ΔR) at 420 nm and 770 nm. The results obtained are shown in Table 2 below.

Comparative Example 1

(Preparation of Pigment Mixture)

As a cyan pigment, 0.2 mass parts of C.I. Pigment Blue 15:3, and as a carbon black pigment, 0.8 mass parts of NIPex 1701Q (manufactured by Evonik Degussa Japan) are mixed, and only stirring at the time of kneading with an extruder is performed without milling treatment to prepare a pigment mixture. The pigment characteristics of obtained pigment mixture are shown together in Table 1 below.

(Preparation of Black Toner and Developer)

In the next place, on and after the operations of (preparation 1 of black toner) in Example 1 are performed in the same manner as in Example 1 except for using the above obtained pigment mixture in place of black particles (1) to prepare five lots in total of black toner particles (H-a), (H-b), (H-c), (H-d) and (H-e), externally added toners (H-a), (H-b), (H-c), (H-d) and (H-e), and developers (H-a), (H-b), (H-c), (H-d) and (H-e) in Comparative Example 1. Toner characteristics of respective black toner particles are shown in Table 2 below.

(Evaluation Test)

An evaluation test is performed in the same manner as in Example 1 by using five lots of developers (H-a) to (H-e), and standard deviation (σ) is computed from the values of reflectance (ΔR) at 420 nm and 770 nm. The results obtained are shown in Table 2 below.

Example 7

(Manufacture of Black Particles)

Black particles (7) are obtained according to the same operations as in Example 1 except for changing the blending amount of the cyan pigment to 0.09 mass parts and the blending amount of the carbon black pigment to 0.91 mass parts. The pigment characteristics of obtained black particles (7) are shown together in Table 1 below.

(Preparation of Black Toner and Developer)

In the next place, five lots in total of black toner particles (7-a), (7-b), (7-c), (7-d) and (7-e), externally added toners (7-a), (7-b), (7-c), (7-d) and (7-e), and developers (7-a), (7-b), (7-c), (7-d) and (7-e) are prepared according to the same operations as in Example 1. Toner characteristics of respective black toner particles are shown in Table 3 below.

(Evaluation Test)

An evaluation test is performed in the same manner as in Example 1 by using five lots of developers (7-a) to (7-e), and standard deviation (σ) is computed from the values of reflectance (ΔR) at 420 nm and 770 nm. The results obtained are shown in Table 3 below.

Example 8

(Manufacture of Black Particles)

Black particles (8) are obtained according to the same operations as in Example 1 except for changing the blending amount of the cyan pigment to 0.1 mass parts and the blending amount of the carbon black pigment to 0.9 mass parts. The pigment characteristics of obtained black particles (8) are shown together in Table 1 below.

(Preparation of Black Toner and Developer)

In the next place, five lots in total of black toner particles (8-a), (8-b), (8-c), (8-d) and (8-e), externally added toners (8-a), (8-b), (8-c), (8-d) and (8-e), and developers (8-a), (8-b), (8-c), (8-d) and (8-e) are prepared according to the same operations as in Example 1. Toner characteristics of respective black toner particles are shown in Table 3 below.

(Evaluation Test)

An evaluation test is performed in the same manner as in Example 1 by using five lots of developers (8-a) to (8-e), and standard deviation (σ) is computed from the values of reflectance (ΔR) at 420 nm and 770 nm. The results obtained are shown in Table 3 below.

Example 9

(Manufacture of Black Particles)
Black particles (9) are obtained according to the same operations as in Example 1 except for changing the blending amount of the cyan pigment to 0.14 mass parts and the blending amount of the carbon black pigment to 0.86 mass parts. The pigment characteristics of obtained black particles (9) are shown together in Table 1 below.
(Preparation of Black Toner and Developer)
In the next place, five lots in total of black toner particles (9-a), (9-b), (9-c), (9-d) and (9-e), externally added toners (9-a), (9-b), (9-c), (9-d) and (9-e), and developers (9-a), (9-b), (9-c), (9-d) and (9-e) are prepared according to the same operations as in Example 1. Toner characteristics of respective black toner particles are shown in Table 3 below.
(Evaluation Test)
An evaluation test is performed in the same manner as in Example 1 by using five lots of developers (9-a) to (9-e), and standard deviation (a) is computed from the values of reflectance (ΔR) at 420 nm and 770 nm. The results obtained are shown in Table 3 below.

Example 10

(Manufacture of Black Particles)
Black particles (10) are obtained according to the same operations as in Example 1 except for changing the blending amount of the cyan pigment to 0.25 mass parts and the blending amount of the carbon black pigment to 0.75 mass parts. The pigment characteristics of obtained black particles (10) are shown together in Table 1 below.
(Preparation of Black Toner and Developer)
In the next place, five lots in total of black toner particles (10-a), (10-b), (10-c), (10-d) and (10-e), externally added toners (10-a), (10-b), (10-c), (10-d) and (10-e), and developers (10-a), (10-b), (10-c), (10-d) and (10-e) are prepared according to the same operations as in Example 1. Toner characteristics of respective black toner particles are shown in Table 3 below.
(Evaluation Test)
An evaluation test is performed in the same manner as in Example 1 by using five lots of developers (10-a) to (10-e), and standard deviation (σ) is computed from the values of reflectance (ΔR) at 420 nm and 770 nm. The results obtained are shown in Table 3 below.

Example 11

(Manufacture of Black Particles)
Black particles (11) are obtained according to the same operations as in Example 1 except for changing the blending amount of the cyan pigment to 0.33 mass parts and the blending amount of the carbon black pigment to 0.64 mass parts. The pigment characteristics of obtained black particles (11) are shown together in Table 1 below.
(Preparation of Black Toner and Developer)
In the next place, five lots in total of black toner particles (11-a), (11-b), (11-c), (11-d) and (11-e), externally added toners (11-a), (11-b), (11-c), (11-d) and (11-e), and developers (11-a), (11-b), (11-c), (11-d) and (11-e) are prepared according to the same operations as in Example 1. Toner characteristics of respective black toner particles are shown in Table 3 below.
(Evaluation Test)
An evaluation test is performed in the same manner as in Example 1 by using five lots of developers (11-a) to (11-e), and standard deviation (σ) is computed from the values of reflectance (ΔR) at 420 nm and 770 nm. The results obtained are shown in Table 3 below.

Example 12

(Manufacture of Black Particles)
Black particles (12) are obtained according to the same operations as in Example 1 except for changing the blending amount of the cyan pigment to 0.4 mass parts and the blending amount of the carbon black pigment to 0.6 mass parts. The pigment characteristics of obtained black particles (12) are shown together in Table 1 below.
(Preparation of Black Toner and Developer)
In the next place, five lots in total of black toner particles (12-a), (12-b), (12-c), (12-d) and (12-e), externally added toners (12-a), (12-b), (12-c), (12-d) and (12-e), and developers (12-a), (12-b), (12-c), (12-d) and (12-e) are prepared according to the same operations as in Example 1. Toner characteristics of respective black toner particles are shown in Table 3 below.
(Evaluation Test)
An evaluation test is performed in the same manner as in Example 1 by using five lots of developers (12-a) to (12-e), and standard deviation (a) is computed from the values of reflectance (ΔR) at 420 nm and 770 nm. The results obtained are shown in Table 3 below.

TABLE 1

| Example No. | Kind of Pigment and Blending Ratio | Milling Time (hr) | Crystallinity |
|---|---|---|---|
| Example 1 | CB/Cyan: 4/1 | 0.5 | 80 |
| Example 2 | CB/Cyan: 4/1 | 24 | 30 |
| Example 3 | Aniline Black/Cyan: 4/1 | 0.5 | 90 |
| Example 4 | Perylene/Cyan: 4/1 | 0.5 | 93 |
| Example 5 | Cuttlefish Ink/Cyan: 4/1 | 0.5 | 70 |
| Example 6 | Titanium Black/Cyan: 4/1 | 0.5 | 98 |
| Example 7 | CB/Cyan: 11/1 | 0.5 | 95 |
| Example 8 | CB/Cyan: 9/1 | 0.5 | 90 |
| Example 9 | CB/Cyan: 8/1 | 0.5 | 85 |
| Example 10 | CB/Cyan: 3/1 | 0.5 | 77 |
| Example 11 | CB/Cyan: 2/1 | 0.5 | 73 |
| Example 12 | CB/Cyan: 3/2 | 0.5 | 70 |
| Comparative Example 1 | CB/Cyan: 4/1 | 0 | 100 |

CB: Carbon black
Cyan: Cyan pigment

TABLE 2

| | Black Toner Particles | | Reflectance | | Standard Deviation (σ) | |
|---|---|---|---|---|---|---|
| Example No. | Sample No. | Volume Average Particle Size (μm) | 420 nm | 770 nm | 420 nm | 770 nm |
| Example 1 | 1-a | 9.3 | 7.1 | 9.1 | 0.645 | 0.728 |
| | 1-b | 9.5 | 7.1 | 10.1 | | |
| | 1-c | 9.2 | 7.9 | 9.2 | | |
| | 1-d | 9.1 | 8.8 | 10.1 | | |
| | 1-e | 9 | 8.1 | 11.1 | | |
| Example 2 | 2-a | 9.5 | 48 | 50 | 0.89 | 0.71 |
| | 2-b | 9.5 | 49 | 50 | | |

TABLE 2-continued

| Example No. | Black Toner Particles Sample No. | Volume Average Particle Size (μm) | Reflectance 420 nm | Reflectance 770 nm | Standard Deviation (σ) 420 nm | Standard Deviation (σ) 770 nm |
|---|---|---|---|---|---|---|
| | 2-c | 9.7 | 50 | 50 | | |
| | 2-d | 9.4 | 48 | 51 | | |
| | 2-e | 9.8 | 48 | 49 | | |
| Example 3 | 3-a | 9.2 | 45 | 48 | 0.84 | 0.71 |
| | 3-b | 9.5 | 46 | 48 | | |
| | 3-c | 9.7 | 47 | 49 | | |
| | 3-d | 9.3 | 46 | 48 | | |
| | 3-e | 9.4 | 45 | 47 | | |
| Example 4 | 4-a | 9.5 | 58 | 59 | 0.84 | 0.84 |
| | 4-b | 9.7 | 56 | 58 | | |
| | 4-c | 9.9 | 57 | 58 | | |
| | 4-d | 9.6 | 58 | 59 | | |
| | 4-e | 9.4 | 57 | 60 | | |
| Example 5 | 5-a | 9.3 | 62 | 63 | 0.84 | 0.84 |
| | 5-b | 9.6 | 61 | 64 | | |
| | 5-c | 9.5 | 60 | 63 | | |
| | 5-d | 9.7 | 60 | 62 | | |
| | 5-e | 9.8 | 61 | 62 | | |
| Example 6 | 6-a | 9.4 | 41 | 44 | 0.89 | 0.71 |
| | 6-b | 9.8 | 41 | 43 | | |
| | 6-c | 9.6 | 42 | 45 | | |
| | 6-d | 9.6 | 41 | 44 | | |
| | 6-e | 9.3 | 43 | 44 | | |
| Comparative Example 1 | H-a | 9.2 | 11 | 13 | 2.25 | 3.49 |
| | H-b | 9.6 | 10 | 15 | | |
| | H-c | 9.3 | 15 | 22 | | |
| | H-d | 9.7 | 16 | 19 | | |
| | H-e | 9.5 | 13 | 17 | | |

TABLE 3

| Example No. | Black Toner Particles Sample No. | Volume Average Particle Size (μm) | Reflectance 420 nm | Reflectance 770 nm | Standard Deviation (σ) 420 nm | Standard Deviation (σ) 770 nm |
|---|---|---|---|---|---|---|
| Example 7 | 7-a | 9.3 | 5.1 | 8.2 | 0.476 | 0.977 |
| | 7-b | 9.5 | 6.1 | 10.2 | | |
| | 7-c | 9.2 | 6.2 | 11.1 | | |
| | 7-d | 9.1 | 6.5 | 10.5 | | |
| | 7-e | 9.0 | 5.8 | 10.2 | | |
| Example 8 | 8-a | 9.5 | 5.2 | 9.1 | 0.554 | 0.881 |
| | 8-b | 9.4 | 5.2 | 11.1 | | |
| | 8-c | 9.4 | 5.5 | 10.1 | | |
| | 8-d | 9.5 | 6.3 | 8.9 | | |
| | 8-e | 9.1 | 6.5 | 8.8 | | |
| Example 9 | 9-a | 9.6 | 5.3 | 9 | 0.568 | 0.781 |
| | 9-b | 9.7 | 5.5 | 11.1 | | |
| | 9-c | 9.8 | 6.3 | 9.9 | | |
| | 9-d | 9.2 | 6.8 | 10.3 | | |
| | 9-e | 9.5 | 6.4 | 9.1 | | |
| Example 10 | 10-a | 9.6 | 8.2 | 8.8 | 0.695 | 0.685 |
| | 10-b | 9.6 | 8.2 | 8.7 | | |
| | 10-c | 9.3 | 9.5 | 10 | | |
| | 10-d | 9.3 | 9.5 | 10.3 | | |
| | 10-e | 9.2 | 9.8 | 8.8 | | |
| Example 11 | 11-a | 9.9 | 8 | 9.2 | 0.842 | 0.539 |
| | 11-b | 9.5 | 8.2 | 7.9 | | |
| | 11-c | 9.5 | 9.9 | 7.9 | | |
| | 11-d | 9.6 | 9.6 | 8.8 | | |
| | 11-e | 9.1 | 9.9 | 8.9 | | |
| Example 12 | 12-a | 9.0 | 10.3 | 8.8 | 0.970 | 0.602 |
| | 12-b | 9.6 | 8.2 | 7.7 | | |
| | 12-c | 9.2 | 8.3 | 8.2 | | |
| | 12-d | 9.5 | 9.6 | 8.5 | | |
| | 12-e | 9.6 | 10.5 | 7.1 | | |

As can be seen from the results in Table 2 above, it has been confirmed that the black toners in Examples 1 to 12 using the black particles of the invention are toners capable of forming display images little in fluctuations of reflectance spectra of light, even when toners are manufactured repeatedly.

What is claimed is:

1. Black particles comprising:
   a black pigment; and
   a cyan pigment,
   wherein
   the black pigment and the cyan pigment are unified in the form of agglomerate.

2. The black particles as claimed in claim 1, wherein
   when the reflectance to light of wavelength of 420 nm and the reflectance to light of wavelength of 770 nm of a plurality of samples are measured, the difference between the average of the reflectance to light of wavelength of 420 nm and the average of the reflectance to light of wavelength of 770 nm is within about 5%.

3. The black particles as claimed in claim 1, wherein
   the blending proportion of the black pigment and the cyan pigment is in the range of about 10/1 to about 2/1 by mass ratio.

4. The black particles as claimed in claim 1, which have a number average particle size of about 1 μm or less.

5. The black particles as claimed in claim 1, wherein
   the cyan pigment is C.I. Pigment Blue 15:3.

6. A method for manufacturing the black particles as claimed in claim 1, the method comprising:
   mixing the black pigment and the cyan pigment; and
   performing a compaction molding while applying load to the mixture of the black pigment and the cyan pigment.

7. The manufacturing method of the black particles as claimed in claim 6, wherein
   an apparatus selected from the group consisting of a ball mill, a turbo crusher, a screen mill and a jet crusher is used for the compaction molding while applying load to the mixture of the black pigment and the cyan pigment.

8. A black toner comprising:
   the black particles as claimed in claim 1; and
   a binder resin.

9. The black toner as claimed in claim 8, wherein
   the binder resin is a polyester resin.

10. The black toner as claimed in claim 8, wherein
    the binder resin has a glass transition temperature (Tg) of about 50° C. to about 80° C.

11. The black toner as claimed in claim 8, wherein
    the binder resin has a softening temperature of about 90° C. to about 150° C.

12. The black toner as claimed in claim 8, wherein
    the binder resin has a mass average molecular weight of about 8,000 to about 15,000.

13. The black toner as claimed in claim 8, wherein
    the blending proportion of the black particles to the total mass of the solid contents constituting the toner is from about 1 mass % to about 15 mass %.

14. A toner container for storing the black toner as claimed in claim 8.

* * * * *